(12) United States Patent
Woxman et al.

(10) Patent No.: US 7,748,924 B2
(45) Date of Patent: Jul. 6, 2010

(54) CONNECTING DEVICE

(76) Inventors: Knut Woxman, Jarenveien 24D, Skui (NO) N-1430; Arne Hansen, Ases vei 179, Sandvika (NO) N-1336

(*) Notice: Subject to any disclaimer, the term of this patent is extended or adjusted under 35 U.S.C. 154(b) by 0 days.

(21) Appl. No.: 11/816,531

(22) PCT Filed: Feb. 15, 2006

(86) PCT No.: PCT/NO2006/000062

§ 371 (c)(1),
(2), (4) Date: Nov. 30, 2007

(87) PCT Pub. No.: WO2006/088374

PCT Pub. Date: Aug. 24, 2006

(65) Prior Publication Data

US 2008/0244882 A1    Oct. 9, 2008

(30) Foreign Application Priority Data

Feb. 17, 2005    (GB) ............................. 0503328.7

(51) Int. Cl.
*F16B 9/00*    (2006.01)

(52) U.S. Cl. .................... 403/319; 403/254

(58) Field of Classification Search ............ 403/252, 403/254–256, 263, 317, 319, 408.1, DIG. 11–14; 411/511, 512, 516, 520, 104; 24/293, 294, 24/296, 297, 457, 458
See application file for complete search history.

(56) References Cited

U.S. PATENT DOCUMENTS

| | | | | |
|---|---|---|---|---|
| 1,602,658 A | * | 10/1926 | Germain | 403/8 |
| 3,005,292 A | * | 10/1961 | Reiland | 52/99 |
| 3,580,535 A | * | 5/1971 | Naske | 248/239 |
| 3,599,693 A | * | 8/1971 | Bucheli | 411/108 |
| 3,680,620 A | * | 8/1972 | Gotschel et al. | 411/176 |
| 3,783,922 A | * | 1/1974 | Petrus | 411/111 |
| 4,047,822 A | * | 9/1977 | Lehmann | 403/187 |
| 4,146,342 A | * | 3/1979 | Cederholm | 403/247 |
| 4,175,915 A | * | 11/1979 | Black et al. | 417/222.1 |
| 4,250,599 A | * | 2/1981 | Nagashima et al. | 24/326 |
| 4,300,850 A | * | 11/1981 | de la Haye et al. | 403/245 |
| 4,353,663 A | * | 10/1982 | Glickman | 403/230 |
| 4,488,844 A | * | 12/1984 | Baubles | 411/85 |
| 4,545,697 A | | 10/1985 | Verdenne et al. | |
| 4,599,011 A | * | 7/1986 | Tashiro et al. | 403/245 |

(Continued)

FOREIGN PATENT DOCUMENTS

DE    3222972    2/1983

(Continued)

*Primary Examiner*—Daniel P Stodola
*Assistant Examiner*—Joshua T Kennedy
(74) *Attorney, Agent, or Firm*—Christian D. Abel

(57) ABSTRACT

A connection device for connecting two structural components is comprising a retaining member in a first structural component and a fixing member for insertion in a second structural component for connecting engagement with the retaining member thereby holding the two structural components together. The fixing member comprises a plug member having a first end and a second end, the the first end comprising an undercut head for insertion in and retaining engagement with the retaining member. The plug member is comprising a member for engagement with the second structural component.

7 Claims, 7 Drawing Sheets

U.S. PATENT DOCUMENTS

| | | | | |
|---|---|---|---|---|
| 4,634,309 A | * | 1/1987 | Dewey | 403/319 |
| 4,758,124 A | * | 7/1988 | Ingeberg | 411/85 |
| 4,948,189 A | * | 8/1990 | Terada et al. | 296/65.13 |
| 5,067,863 A | * | 11/1991 | Kowalski | 411/85 |
| 5,135,341 A | * | 8/1992 | Leyder | 411/182 |
| 5,193,961 A | | 3/1993 | Hoyle et al. | |
| 5,271,586 A | * | 12/1993 | Schmidt | 248/58 |
| 5,326,061 A | * | 7/1994 | Hamilton | 248/239 |
| 5,437,516 A | * | 8/1995 | Sauerwein et al. | 404/2 |
| 5,469,606 A | * | 11/1995 | Hansen | 24/662 |
| 5,489,173 A | | 2/1996 | Hofle | |
| 5,628,597 A | * | 5/1997 | Chudoba et al. | 411/85 |
| 5,810,505 A | * | 9/1998 | Henriott et al. | 403/230 |
| 6,036,398 A | * | 3/2000 | Theodorou | 403/292 |
| 6,132,154 A | * | 10/2000 | Easter | 411/508 |
| 6,554,235 B1 | * | 4/2003 | Fortier | 248/122.1 |
| 6,726,117 B2 | * | 4/2004 | Herb et al. | 238/315 |
| 6,824,123 B2 | * | 11/2004 | Larsen et al. | 256/65.01 |
| 7,431,409 B2 | * | 10/2008 | Yang | 312/265.5 |

FOREIGN PATENT DOCUMENTS

| | | |
|---|---|---|
| EP | 0976645 | 2/2000 |
| FR | 002848622 | 6/2004 |
| GB | 0865081 | 4/1961 |
| GB | 1191069 | 5/1970 |
| GB | 1418952 | 12/1975 |
| GB | 0887816 | 11/2007 |
| WO | 9200461 | 1/1992 |

* cited by examiner

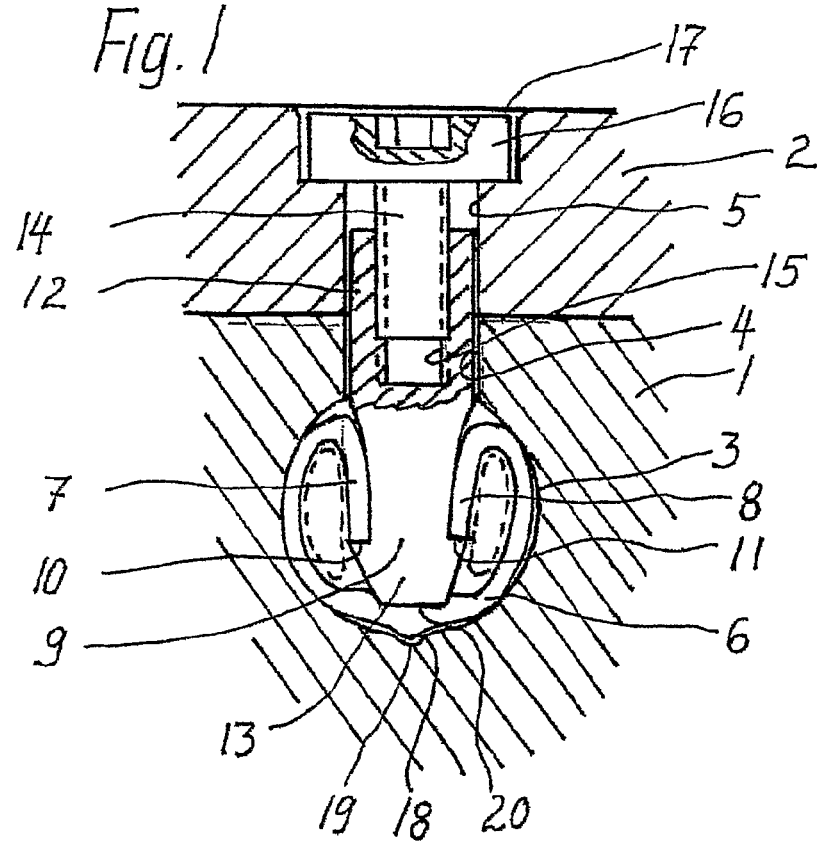
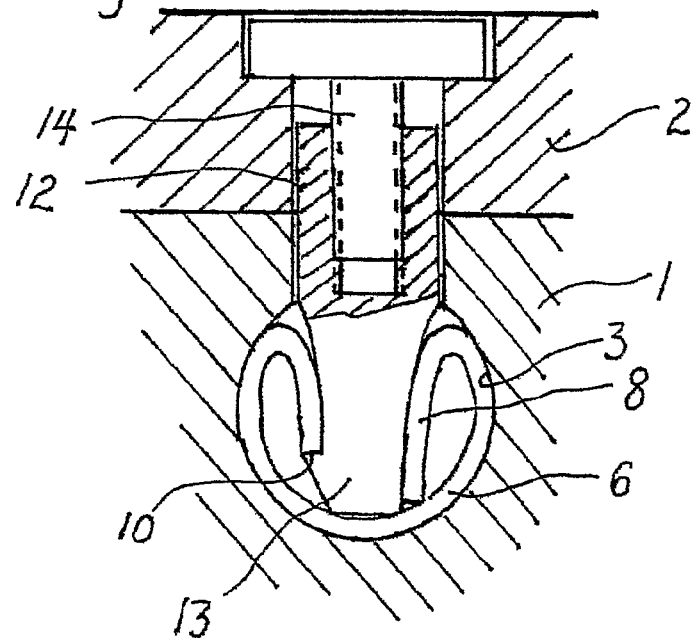

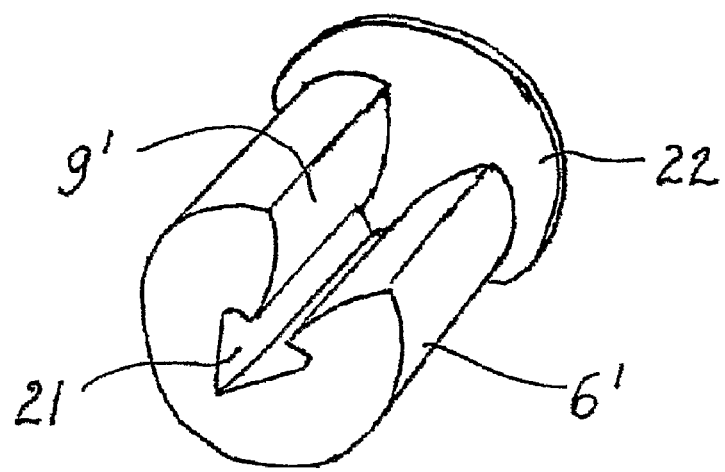
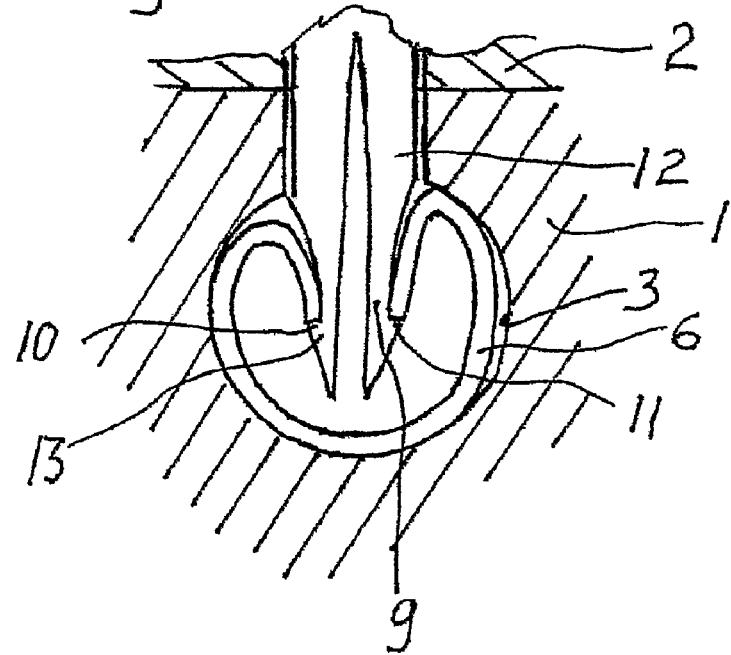

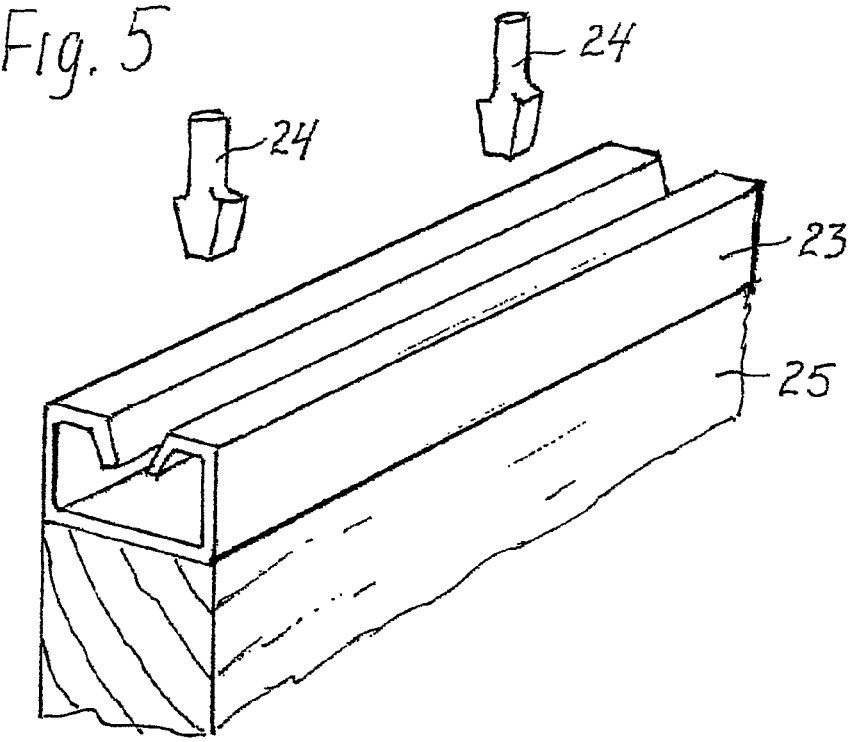
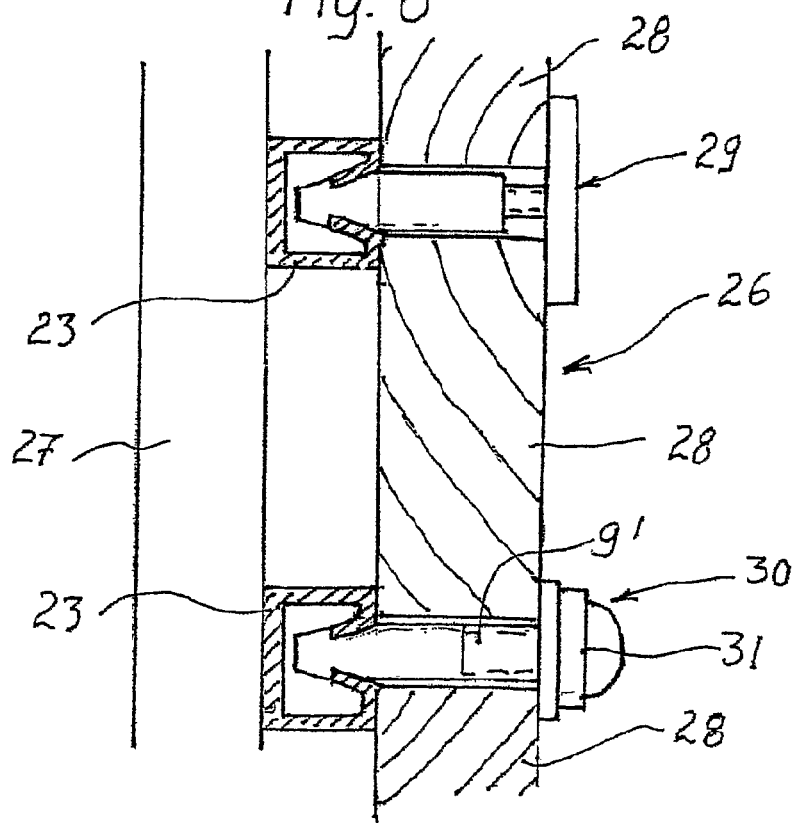

CONNECTING DEVICE

DESCRIPTION OF RELATED ART

WO/9200461 discloses a clamp means for connecting objects in a strong and simple way. The clamp means comprises a female part having a U-form and one or two portions extending inwards in the U and providing one or two barbs for retaining a male part extending into the female part.

A well known furniture connector is one which comprises an excenter groove plug cooperating with a head on a bolt. The plug is inserted in a bore in the one furniture part and the bolt is inserted through a bore in the other furniture part and engages the plug. A turning of the bolt results in a tightening of the connection.

There are also known snap fasteners wherein a plug having an undercut or enlarged head cooperates with a more or less resilient receptacle.

The first mentioned clamp means gives a simple and secure connection between two objects but is, however, dependent on tight tolerances in order to result in a stable connection. Said furniture connector gives a good and possibly later tightable connection between furniture parts but calls for a certain adaption and orientation of the plug for engagement with the bolt head.

Snap fasteners are simple and cheap but will mostly have a certain loosenes and they cannot be tightened at the time of connection or later.

It is especially for furniture important that it is possible to tighten the connectors at the time of connection and later. There is a need for a such cheap, fast and simple and tightable connector, especially for furniture.

BRIEF SUMMARY OF THE INVENTION

The object of the present invention is to provide for a such connector, especially for furniture components but also more generally for structural components.

This object is achieved with a connecting device as disclosed in claim 1. Further advantageous feature are disclosed in the dependant claims.

The invention combines the easiness of snap fasteners with the possibility of tightening the connection. The need for close tolerances is eliminated and a connection between two structural components is realised in a releasable and tightable way.

Used as a furniture connector with a profile element with a longitudinal slot the invention will simplify the placing together of components and the connection can be realised in a more simple way, without specific calls for mutual adaption and orientation in that the new profile element has a slot for insertion of the plug head so that the plug and its head can be inserted in the slot provided the slot is given a fairly correct orientation relative the plug before such insertion. What it takes is that the plug must only be inserted in the profile element through the slot so that the undercut head engages behind the internal retaining engagement means. Thereafter the device can be tightened in that the tightening means is tightened, whereby the undercut head is pressed against the internal retaining engagements means and the second structural component is drawn tight against the first structural component.

A preferable embodiment is one where the profile element is a plate metal member which is rolled and/or bent to a sleeve form having at least on plate edge portion extending inwardly in the profile and forming the retaining engagement means.

Preferably the undercut head may have a groove for receiving the plate edge portion. The plate edge portion and the undercut head will then be locked together, thereby enhancing the connection.

Preferably the plug member may have a longitudinal dimension resulting in that the said second end will extend out from the first structural component when the undercut head is inserted and retained in the retaining means. The plug member may the have a centering or guiding function for the second structural component, an advantage when putting together two or more components, f.inst. a shelf.

The retaining means may have a longitudinal dimension enabling the use of more then one fixing means together with the retaining means.

Another preferable embodiment is one where the retaining means comprises a cylindrical body having an outer peripherical surface, a longitudinal slot extending radial inwards from said surface and ending in an enlarged cavity in said body for receiving and retaining engagement with the said head.

A preferable embodiment of the invention is one where the connecting device further includes a locking member adapted for insertion in locking engagement with the mutually engaged retaining means and fixing means.

In order to be able to release the plug member from the engagement with the retaining means, especially in connection with larger structures and connecting devices the plug member when cooperating with a profile element may have an internal bore having a diameter at least equal to the dimension across the undercut head so that the bore will opens out behind and adjacent the undercut head, thus enabling a rod or a screw, provided the bore is threaded, to push the edge portions out of engagement with the undercut plug head.

The orientation of the profile member in a bore in a structural component is not critical as long as the slot is fairly oriented to receive the plug head but preferably the profile element may have an outer fixating element for the cooperation with a wall in the bore.

The insertion of the plug head through the slot in the profile element calls normally for a certain flexibility in the plug head and/or in the profile element. Thus the profile elements and/or the plug head are provided with a certain compression and expansion potential.

BRIEF DESCRIPTION OF THE DRAWINGS

Characteristics and advantages of the invention will be apparent from the following description of some embodiments, which are to be intended only as examples and not as limitations with reference to the enclosed drawings, wherein:

FIG. 1 shows a section of a preferred connector according to the invention;

FIG. 2 shows a section of a modified connector according to the invention;

FIG. 3 shows a section of a third preferred embodiment of the invention;

FIG. 4 shows a perspective view of a possible profile element according to the invention;

FIG. 5 shows a perspective view of an elongated profile element according to the invention;

FIG. 6 shows a section through a wall or fence provided by means of the invention;

DETAILED DESCRIPTION OF THE PREFERRED EMBODIMENTS

Figure 7:
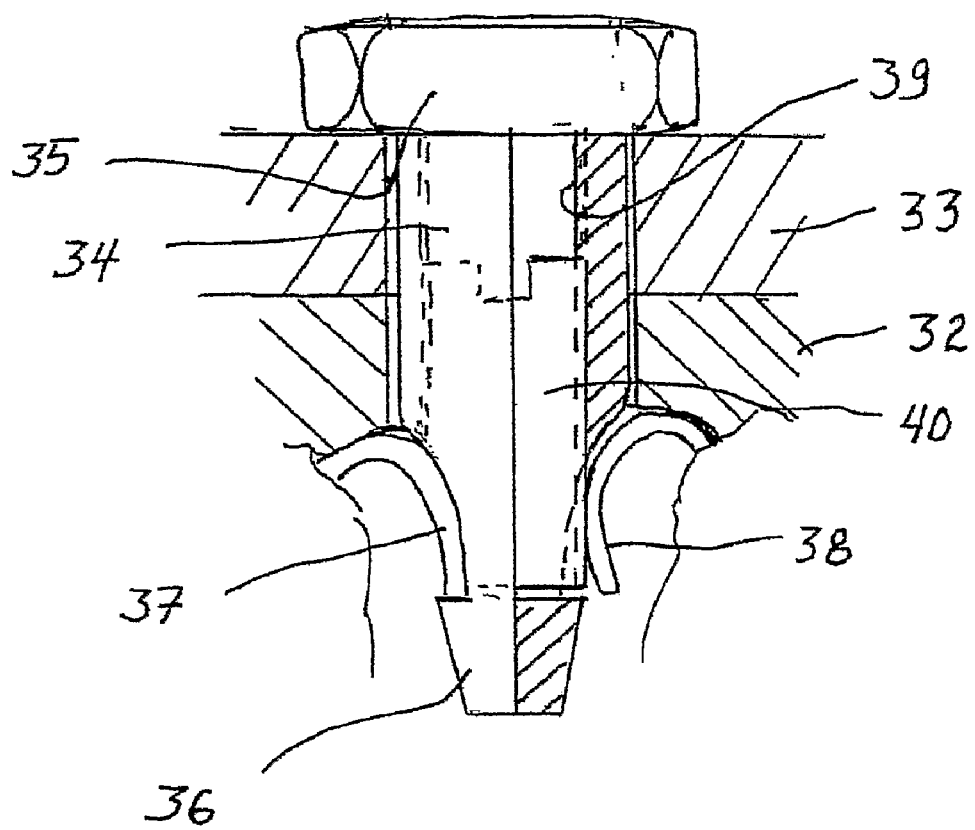
FIG. 7 shows a section through an embodiment where the plug member may be released from the profile element.

With reference to the above figures FIG. 1 shows a preferred connector according to the invention for the connection of two furniture parts or structural components 1 and 2. A blind bore 3 is provided in the first furniture part 1. An opening 4 in the form of a bore extends from the side of the furniture part 1 facing the second furniture part 2 and opens into the blind bore 3. The second furniture part 2 has a throughgoing bore 5.

A profile element 6 is arranged in the blind bore 3 with the slot 9, formed by the inwardly extending edge portions 7,8, oriented towards the bore 4. As shown the edge portions 7,8 provide retaining means or barbs 10 and 11. When connecting the furniture parts 1 and 2 a plug 12 is inserted through the bore 4 and in through the slot 9 until the undercut plug head 13 is placed behind the barbs 10,11, as shown in FIG. 1. The plug 12 has a such length that it extends into the furniture part 2 and thus may be used as a centering or orienting means to achieve a correct alignment of the furniture parts 1 and 2 with the bores 4 and 5 in alignment. A screw 14 is shown threaded in a threaded bore 15 in the plug 12. The screw head 16 is tightened towards and against the second furniture part 2, in a cavity 17.

It will be understood that the orientation of the profile element 6 in the blind bore 3 is not critical. Important is only that the slot 9 is so oriented that the plug head 13 can enter the slot.

As shown the profile element 6 may have an outer guiding or fixating element 18 for cooperation with a groove 19 in the blind bore 3 or for pressing into the material in the furniture part 1, provided the profile element 6 is dimensioned for narrow tolerance in the blind bore 3.

In the profile element 6 there may be a guiding cavity 20 for fixating cooperation with the end of the plug head 13. If additionally the portions 7 and 8 are given a convex shape corresponding to the concave flanks of the plug 12 behind the undercut head 13, a very stable and secure connection will be achieved when the screw 14,16 is tightened. Broken lines indicate a locking member which will be explained later.

The embodiment in FIG. 2 is a modification of the FIG. 1 embodiment and corresponding features are given the same reference numbers to the drawing as in FIG. 1. The main difference is that the embodiment in FIG. 2 has only one barb 10 whereas the other edge portion 8 is drawn down against the bottom in the profile element 6. Correspondingly the plug head 13 is undercut only on one side, for cooperation with the barb 10.

FIG. 3 shows an embodiment where corresponding features have the same references as in FIG. 1. The plug 12 i.e. its head 13 is split in order to give the plug head a resiliency necessary to enter the slot 9 and engage behind the barbs 10 and 11.

FIG. 4 shows a possible profile element 6' in the form of a cylindrical body having a slot 9' extending radial inwards and ending in a cavity 21 for receiving the undercut plug head (not shown). This profile element 6' may preferably be in a plastic material. It has here an enlarged massive head 22 adapted to close the bore wherein the element 6' is placed.

An elongated profile element 23 is shown in FIG. 5. This profile element 23 is adapted for cooperation with a number of plug members 24, as shown in the figure and is fastened to a structural component 25 by means of screws (not shown).

Such elongated elements 23 may for inst. be used in the erection of a fence 26 or wall as shown in FIG. 6. A number of elongated elements 23 are by suitable means f.inst. screws (not shown) fastened to posts 27 (only one post shown). Planks 28 are connected to the profile elements 23 by means of fixing means according to the invention. FIG. 6 shows a fixing means 29 as in FIG. 1 whereas the other fixing means 30 is modified in that the plug 9''' is threaded and cooperates with a head nut 31.

The person skilled in the art will appreciate that the plug and the profile element may have other suitable form and that the undercut engagement may be realised in other equivalent forms than here shown and described. There may be situations where the springy effect is not necessary, as f.inst. when using elements as in FIG. 5 where the plugs may be inserted lengthwise in the profile elements. Both the profile element and the plug may have a certain resiliency, as caused by the material used or by the specific springy form of the two parts.

FIG. 7 shows an embodiment substantially as in FIG. 1. The two structural components 32 and 33 are connected by means of a plug member 34 having an undercut head 36 engaging the plate portions 37 and 38. The plug member has an internal threaded bore 39 where a threaded element 40 is threaded. The diameter of the bore 39 is so large that the bore 39 penetrates the plug member wall behind the undercut head 36. Thus, when threaded into the bore 39 the threaded element will push the plate portions out of engagement as disclosed in the right part of the FIG. 7, where the plate portion 38 is shown pushed out sideways. The plug member will then be free and can be pulled out. In FIG. 7 the plug member 34 is tightened by means of a nut 35.

Figure 8:
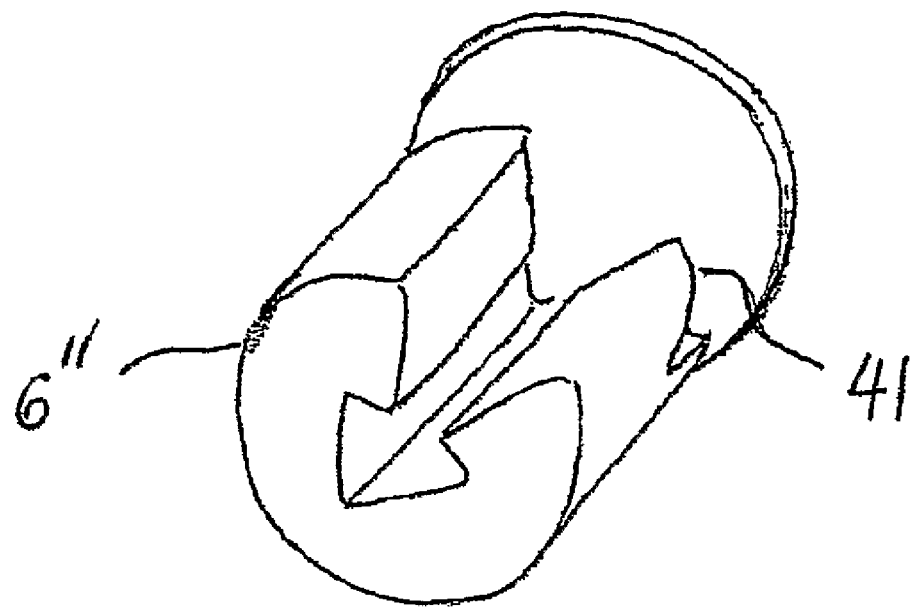
FIG. 8 shows a modification of the profile element in FIG. 4.
Figure 9:
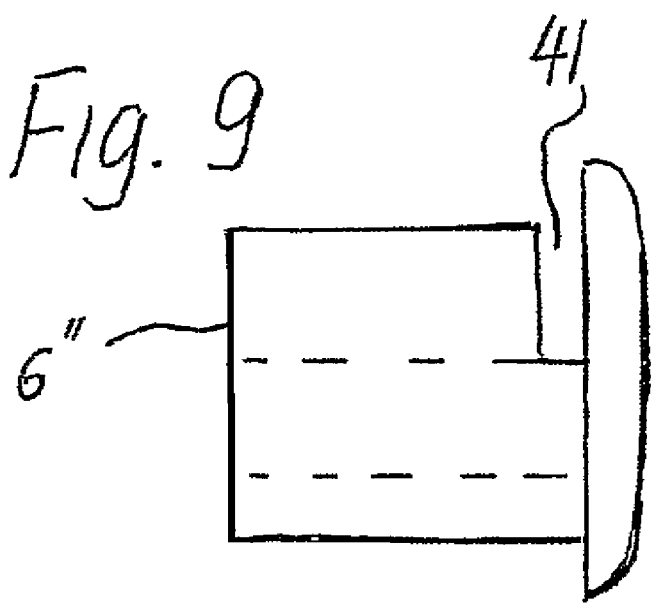
FIG. 9 shows a side view of the element in FIG. 8.

FIGS. 8 and 9 show a modification of the element in FIG. 4. The element 6" is as in FIG. 4 but is given a flexibility in that a cut 41 is performed in the body thus giving the element a certain flexing capacity, corresponding to that of the flexible plate portions 7 and 8 in FIG. 1.

Figure 10:
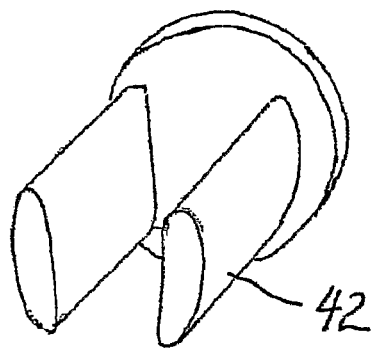
FIGS. 10-12 show possible embodiments of locking members.
Figure 11:
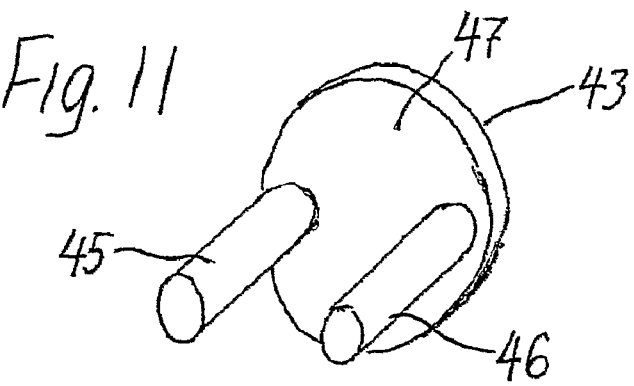
Figure 12:
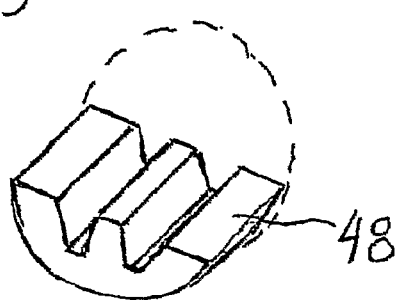

In certain cases there may be a need for securing or locking the retaining engagement and the FIGS. 10-12 show possible locking members to be used, f.inst. as indicated with broken lines in FIG. 1 where a locking member 42 as in FIG. 10 is inserted in the bore 3. The locking member will back the plate portions 7 and 8 as shown in FIG. 1.

Another possible locking member is that in FIG. 11. This locking member 43 has two pins 45,46 extending out from a plate or head 47 and may be inserted and used as shown in FIG. 13.

FIG. 12 shows a locking member 48 which may be used as shown in FIG. 14.

Figure 13:
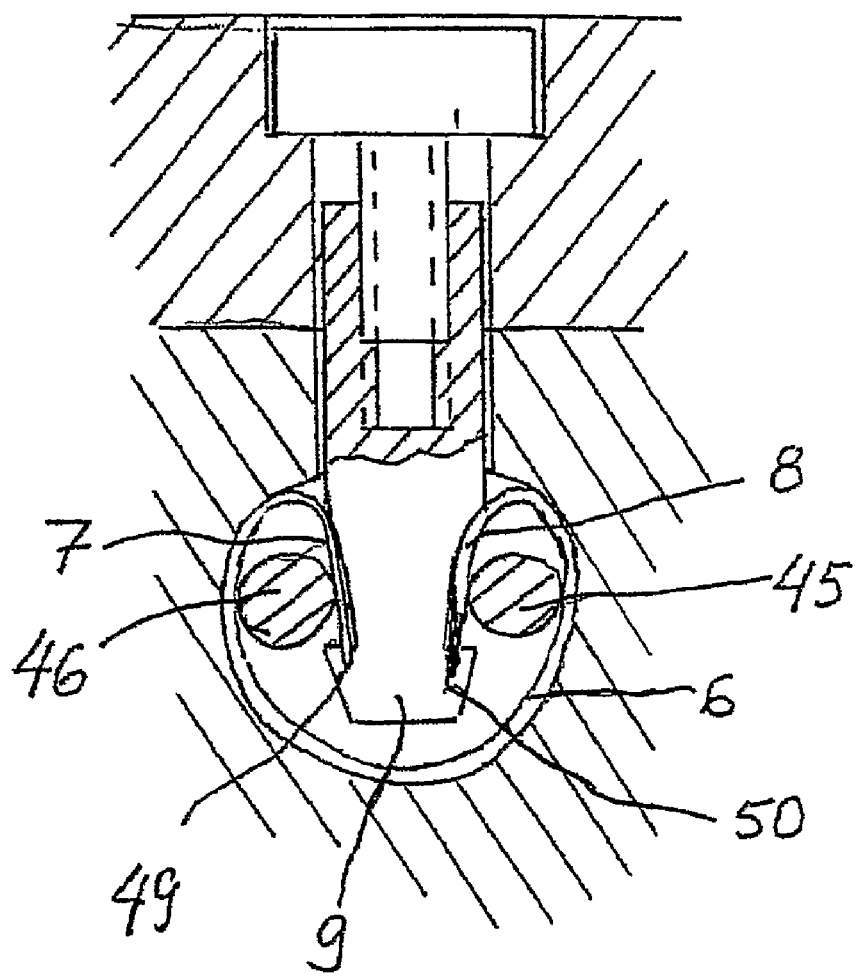
FIG. 13 shows a section of another embodiment according to the invention.

FIG. 13 shows an embodiment substantially as in FIG. 1 but where the profile element 6 is made of thin flatsteel, the ends of the inwardly bent portions 7 and 8 being received in grooves 49,50 in the undercut head 9. Additionally the retaining engagement is strengthened in that a locking member 45,46 is inserted.

The invention claimed is:

1. Connecting device for connecting first and second structural components, the connecting device comprising a first part and a second part adapted for connecting engagement, said first part being engageable with the first structural component and said second part being engageable with the second structural component, said first part comprising:

a substantially cylindrical body having an internal cavity and an outer peripheral surface having a longitudinal slot, said slot being formed by barbs, having interior and exterior surfaces, extending radially inwards from said outer peripheral surface into the internal cavity of the body, said barbs having their exterior surfaces positioned in the cavity of the cylindrical body at a distance from and facing one another;

said second part comprising:

an elongated plug member having a first end and a second end, said first end comprising an undercut head for insertion into said longitudinal slot, said head having a width greater than the distance between the exterior surfaces of the barbs, and further wherein either the head or the barbs of the slot are flexible and resilient;

wherein the first and second parts are arranged such that upon insertion of the second part into the longitudinal slot, said head presses past the barbs by flexible displacement of either the head or the barbs, said displaced part resiliently returning to its non-displaced state once the head has extended beyond the ends of the barbs, such that at least one of the ends of the barbs connectably engages the undercut portion of said head, the connecting device further comprising a locking member adapted for transverse insertion through a hole in the first structural component, said locking member comprising at least one extended portion that abuts the interior surfaces of said barbs, holding said barbs into engagement with the undercut head of the plug member.

2. Connecting device according to claim 1, wherein the mainly cylindrical body is formed by a planar sheet material being rolled or bent into a sleeve, and wherein the longitudinal edges of the sheet material are folded or bent into the internal cavity of the sleeve, such that the portion of the sheet material adjacent the longitudinal edges forms the barbs, and the longitudinal edges of the sheet material form the ends of the barbs.

3. Connecting device as in claim 1, wherein said undercut head is adapted to receive at least one of said barb ends in a groove.

4. Connecting device according to claim 1, wherein said plug member has a longitudinal dimension resulting in that said second end will extend beyond said first structural component when said undercut head is inserted and retained in said longitudinal slot.

5. Connecting device according to claim 1, wherein said barbs are flexible, and the head portion of the plug member is rigid.

6. Connecting device according to any one of claims 1-5, wherein the second part further comprises tightening means for tightening the connection between the first and second parts.

7. Connecting device according to claim 6, wherein the tightening means comprise a threaded member adapted for threaded engagement with a threaded internal bore of said plug member.

* * * * *